Patented Oct. 4, 1932

1,880,996

UNITED STATES PATENT OFFICE

ROBERT STOCKER, OF BASEL, AND JAKOB MÜLLER, OF MÜNCHENSTEIN, NEAR BASEL, SWITZERLAND, ASSIGNORS TO SOCIETY OF CHEMICAL INDUSTRY IN BASLE, OF BASEL, SWITZERLAND

PROCESS FOR THE MANUFACTURE OF LEUCO THIOINDIGO ACYL DERIVATIVES

No Drawing. Application filed June 1, 1928, Serial No. 282,271, and in Switzerland June 8, 1927.

The present invention relates to derivatives of vat dyestuffs. It comprises the new products, their process of manufacture, their application, and the material that has been dyed with the new products.

It has been found that new derivatives of vat dyestuffs of the thioindigo series are obtained by treating their leuco compounds with such aliphatic carboxylic acids which contain a mobile atom of halogen, such for example as monohalogen acetic acids, β-chloropropionic acid, etc.

The products thus obtained, which are advantageously prepared in an aqueous solution, are in most part surprisingly easily converted in presence of acids or alkalies and oxidation agents into the corresponding dyestuffs. This behaviour permits their application for the production of fast tints on the fibre. The new products form more or less strongly colored powders which may dissolve in water or dilute acids with difficulty, but which are always easily soluble in alkalies, mostly with a characteristic fluorescence. This is particularly the case if halogenated carboxylic acids have been used. The formula of the new products has not been ascertained with certainty. From the analysis it seems to appear that in at least one of the OH-groups of the leuco compound the hydrogen atom has changed the position with the mobile halogen atom of the halogenated acid to form an ethereal product.

The following examples illustrate the invention, the parts being by weight:—

Example 1

To a solution of 350 parts of leucothioindigo of the formula

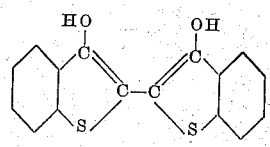

in 150 parts of sodium hydroxide and 350 parts of water there are added 330 parts of chloroacetic acid dissolved in 1500 parts of water with addition of 200 parts of sodium carbonate, and the mixture is heated for 1 hour to 75–80° C. The whole is then filtered to remove some traces of unchanged leucothioindigo, and the filtrate acidified with 200 parts of concentrated hydrochloric acid, whereby the condensation product separates in form of an orange-yellow powder which is filtered off, washed with water, and dried. The reddish-brown substance thus obtained dissolves in alcohol with great difficulty, and is insoluble in ether, benzene, chloroform, water and dilute acids, but dissolves very easily in cold, dilute caustic soda solution with a strong blue fluorescence. When acidified the new compound separates and is then reconverted to thioindigo by heating in presence of an oxidation agent, such as ferric chloride. Also the alkaline solution regenerates the indigoid dyestuff when heated with oxidation agents, such for example as potassium ferricyanide. The new product is free from halogen so that it may be supposed that at least one of the two OH-groups of the leucothioindigo has been converted into an $OCH_2COOH$-group.

The preparation of the new product may also be conducted in such a manner that the condensation with chloroacetic acid is carried out directly in the vat solution.

Similar leuco derivatives are obtained with the most various substitution products of thioindigo, such for example as the 6:6'-dichloro- or the 5:5'-dibromothioindigo.

Like products are also obtained by substituting monobromoacetic acid for monochloroacetic acid.

Example 2

44 parts of leucothioindigo are dissolved in 12 parts of caustic soda and 240 parts of water, and then alternatively mixed, on the one part, with a solution of 48 parts of β-chloropropionic acid in 200 parts of water, and, on the other part, with 24 parts of sodium carbonate in 100 parts of water. The mixture is advantageously allowed to react for 1 hour at 75–80° C. After the condensation is complete the solution filtered off from some traces of unchanged leucobody is acidified with 84 parts of concentrated hydrochloric acid. The condensation product is thus separated in form of an orange-brown flocculent powder which is filtered, washed with water, and dried.

The red-brown substance obtained in this manner is insoluble in water and dilute acids, but easily soluble in cold, dilute caustic soda solution with red-brown coloration and green-blue fluorescence. From the alkaline solution the product may be separated again by acidification. When heated in presence of acids and oxidation agents, such for example as ferric chloride, splitting and oxidation to the dyestuff occurs.

The operation is conducted in a similar manner if benzylchloride para-sulfonic acid is substituted for β-chloropropionic acid. The products obtained are then already soluble in water or dilute acids.

What we claim is:—

1. Process for the manufacture of leuco thioindigo acyl derivatives, consisting in treating leuco thioindigo derivatives of the benzene series with such aliphatic carboxylic acids which contain a mobile atom of halogen attached to a $CH_2$-group.

2. Process for the maufacture of leuco thioindigo acyl derivatives, consisting in treating leuco thioindigo derivatives of the benzene series with such aliphatic carboxylic acids which contain at the most three carbon atoms and a mobile atom of halogen attached to a $CH_2$-group.

3. Process for the manufacture of a leuco thioindigo acetyl derivative, consisting in treating leuco thioindigo with monochloroacetic acid.

4. The leuco thioindigo acyl derivatives which are probably ethereal products and obtainable by treating the leuco thioindigo derivatives of the benzene series with such aliphatic carboxylic acids which contain a mobile atom of halogen attached to a $CH_2$-group, which products, when dry, form more or less deeply colored powders soluble in alkalies with a distinct fluorescence, and which, when heated with acids or alkalies in presence of oxidation agents, are re-converted into the vat dyestuffs.

5. The leuco thioindigo acyl derivatives which are probably ethereal products and are obtainable by treating the leuco thioindigo derivatives of the benzene series with such aliphatic carboxylic acids which contain at the most three carbon atoms and a mobile atom of halogen attached to a $CH_2$-group, which products, when dry, form more or less deeply colored powders soluble in alkalies with a distinct fluorescence, and which, when heated with acids or alkalies in presence of oxidation agents, are re-converted into the vat dyestuffs.

6. The leuco thioindigo acetyl derivative obtainable by treating leuco thioindigo with a monohalogen-acetic acid, which product forms a brown powder insoluble in water and dilute acids but soluble in caustic alkalies with blue fluorescence, and which, when heated with acids or alkalies in presence of oxidation agents, is re-converted into thioindigo.

In witness whereof we have hereunto signed our names this 21st day of May, 1928.

ROBERT STOCKER.
JAKOB MÜLLER.